(12) United States Patent
Cao et al.

(10) Patent No.: US 12,744,275 B2
(45) Date of Patent: Sep. 22, 2026

(54) BATTERY MODULE, BATTERY PACK AND ELECTRIC VEHICLE

(71) Applicants: REPT BATTERO Energy Co., Ltd., Wenzhou (CN); Shanghai Ruipu Energy Co., Ltd., Shanghai (CN)

(72) Inventors: Hui Cao, Wenzhou (CN); Kai Cao, Wenzhou (CN); Yingqi Chen, Shanghai (CN); Wei Liu, Shanghai (CN); Dandan Chen, Shanghai (CN); Xiaofeng Yang, Shanghai (CN); Min Hou, Shanghai (CN); Xianfeng Yu, Wenzhou (CN); Chan Liu, Shanghai (CN); Zhaoyu Yu, Wenzhou (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 749 days.

(21) Appl. No.: 18/105,703

(22) Filed: Feb. 3, 2023

(65) Prior Publication Data

US 2023/0187760 A1 Jun. 15, 2023

Related U.S. Application Data

(63) Continuation of application No. PCT/CN2022/100922, filed on Jun. 23, 2022.

(30) Foreign Application Priority Data

Jul. 15, 2021 (CN) ........................ 202121612263.X
Jul. 23, 2021 (CN) ........................ 202121690653.9
(Continued)

(51) Int. Cl.

| | |
|---|---|
| ***H01M 50/264*** | (2021.01) |
| ***H01M 50/209*** | (2021.01) |
| ***H01M 50/289*** | (2021.01) |

(52) U.S. Cl.
CPC ....... *H01M 50/264* (2021.01); *H01M 50/209* (2021.01); *H01M 50/289* (2021.01); *H01M 2220/20* (2013.01)

(58) Field of Classification Search
None
See application file for complete search history.

(56) References Cited

U.S. PATENT DOCUMENTS 8,994,300 B2 3/2015 Ohkura
9,741,974 B2 8/2017 Kwon et al.
(Continued)

FOREIGN PATENT DOCUMENTS

AU 2021101290 A4 5/2021
CN 113013543 A 6/2021
(Continued)

OTHER PUBLICATIONS

Machine Translation of JP2001291533 (Year: 2001).*
(Continued)

*Primary Examiner* — Wyatt P Mcconnell
(74) *Attorney, Agent, or Firm* — Quarles & Brady LLP

(57) ABSTRACT

A battery module comprises a fixing component including a plurality of insertion posts, the insertion posts being sandwiched between a plurality of the cells. Further, the cell is provided with a fillet structure on the edges and the insertion post is connected to the fillet structure. According to the battery module, a plurality of removable reinforcement points are provided by a plurality of insertion posts, which do not affect the stacking density of the cells in the battery pack, and increasing the mechanical connection strength of the battery module. The removable design of the battery module and insertion posts solves the maintenance problem of the integrated battery pack and improves the safety of the battery module, featuring high structural strength, integrity
(Continued)

and stability. A battery pack can include the battery module and an electric vehicle can include the battery pack.

26 Claims, 12 Drawing Sheets

(30) Foreign Application Priority Data

Dec. 6, 2021 (CN) ......................... 202111480849.X
Dec. 6, 2021 (CN) ......................... 202123045445.6

(56) References Cited

U.S. PATENT DOCUMENTS

| | | | |
|---|---|---|---|
| 10,103,367 | B2 | 10/2018 | DeKeuster et al. |
| 2011/0217587 | A1 | 9/2011 | An et al. |
| 2016/0172642 | A1 | 6/2016 | Hughes et al. |
| 2016/0344003 | A1 | 11/2016 | Yamada et al. |
| 2020/0212390 | A1 | 7/2020 | Kume et al. |

FOREIGN PATENT DOCUMENTS

| | | | |
|---|---|---|---|
| CN | 213366696 | U | 6/2021 |
| CN | 213636183 | U | 7/2021 |
| CN | 114069153 | A | 2/2022 |
| CN | 215731960 | U | 2/2022 |
| CN | 215731970 | U | 2/2022 |
| CN | 215761960 | U | 2/2022 |
| DE | 102017209342 | B4 | 5/2024 |
| JP | 2000100401 | A | 4/2000 |
| JP | 2001291533 | * | 10/2001 |
| JP | 2001291533 | A | 10/2001 |
| JP | 2002184374 | A | 6/2002 |
| JP | 2011165628 | A | 8/2011 |
| JP | 2011171176 | A | 9/2011 |
| JP | 2014197517 | A | 10/2014 |
| JP | 2016139778 | A | 8/2016 |
| JP | 2018503227 | A | 2/2018 |
| JP | 2020098723 | A | 6/2020 |
| WO | 2013098982 | A1 | 7/2013 |
| WO | 2019049760 | A1 | 3/2019 |
| WO | 2020235116 | A1 | 11/2020 |

OTHER PUBLICATIONS

Japanese Patent Office, Notice of Reasons for Refusal and Search Report, Application No. 2023-503222, May 31, 2024, 55 pages.
PCT International Search Report and Written Opinion, PCT/CN2022/100922, Sep. 8, 2022, 14 pages.
European Patent Office, Extended European Search Report, Application No. 22822253.5, Aug. 13, 2024, 10 pages.
Japanese Patent Office, 2nd Notice of Reasons for Refusal, Application No. 2023-503222, Jan. 7, 2025, 9 pages.
Intellectual Property India, Examination Report, Application No. 202317008387, May 11, 2026, 8 pages.

* cited by examiner

BATTERY MODULE, BATTERY PACK AND ELECTRIC VEHICLE

CROSS-REFERENCE TO RELATED APPLICATIONS

This application is a continuation of International Patent Application No. PCT/CN2022/100922 filed Jun. 23, 2022, which claims priority to Chinese Patent Application No. 202121612263.X filed Jul. 15, 2021; Chinese Patent Application No. 202121690653.9 filed Jul. 23, 2021; Chinese Patent Application No. 202111480849.X filed Dec. 6, 2021; and Chinese Patent Application No. 202123045445.6 filed Dec. 6, 2021, the disclosures of which are incorporated herein by reference in their entirety and for all purposes.

TECHNOLOGICAL FIELD

This disclosure relates to the field of batteries, more specifically to a battery module, and a battery pack including the battery module, and an electric vehicle including the battery pack.

BACKGROUND

Some battery packs include a hollow case and a battery module set inside the case. In order to improve the formation rate of the battery module, the battery pack is usually assembled with aluminum alloy profiles, which increases the manufacturing cost of the battery pack.

In order to improve the energy density, as much size as possible is usually used for the cell arrangement in the battery pack, leaving less space for structural parts. In order to fix the battery module, the paste method is usually used, for example, the double-sided tape is used to paste the battery module on the inner wall of the case. However, the adhesion of the tape will decrease with the increase of using time, causing the loosening of the battery module, which has a greater impact on the use of the battery pack; moreover, the performance of the glue itself is not highly monitorable in the production process, which is prone to batch product failure; in addition, the battery module is not removable by means of pasting, which is inconvenient to use.

In addition, for the battery pack of power battery, in order to improve the performance of the battery, a denser cell stacking form will be used, and a fixed point cannot be set in the battery pack. If the fixed point is set, it will waste more horizontal space or vertical space inside the battery pack.

SUMMARY

The technical problem to be solved by the invention is to propose a battery module comprising a plurality of removable reinforcement points, and a battery pack, and an electric vehicle.

The invention proposes a battery module to solve the above technical problem, comprising a plurality of cells, wherein comprises a fixing component, wherein the fixing component comprises a plurality of insertion posts, the insertion post being sandwiched between a plurality of the cells.

In an embodiment of the invention, the cell is provided with a fillet structure on the edges, and the insertion post and the fillet structure is connected with each other.

In an embodiment of the invention, the insertion post comprises an inner cavity and an outer abutment layer, wherein the inner cavity is provided within the outer abutment layer, and the outer abutment layer and the cell is connected with each other.

In an embodiment of the invention, the outer abutment layer is an insulating layer.

In an embodiment of the invention, the insertion post comprises a body, wherein the body comprises an inner cavity and an outer abutment layer, the inner cavity passing through the body, the battery module further comprising a fastener, wherein the fastener is inserted in the inner cavity, and the fastener is used to fix the insertion post.

In an embodiment of the invention, the body is provided with a supporting platform on its top for holding the fastener's head, and the width of the supporting platform is larger than the diameter of the body.

In an embodiment of the invention, a plurality of the insertion posts are connected to form a fixing group.

In an embodiment of the invention, a plurality of the fixing groups are provided by connecting.

In an embodiment of the invention, the fixing group is provided with a plurality of connecting pieces, and a plurality of the fixing groups are connected by the connecting pieces.

In an embodiment of the invention, it further comprises a cell pack and a spacing board, wherein each cell pack comprises a plurality of cells, each cell having a width extending in a first direction, the plurality of cells arranged in the first direction to form the cell pack, the spacing board provided between the adjacent cell packs, the spacing board extending in the first direction, a plurality of the insertion posts evenly spaced on the spacing board, a distance between the adjacent insertion posts corresponding to the width of the cell, the cell being fixedly provided between the adjacent insertion posts.

In an embodiment of the invention, the spacing board is provided with a flap plate and a deformation zone, wherein the flap plate and the insertion post are set perpendicular to each other, and the flap plate is provided by protruding from the spacing board, and the flap plate is provided with a mounting hole, wherein the mounting hole is set corresponding to the inner cavity and the deformation zone is provided at the end of the spacing board.

In an embodiment of the invention, it further comprises an end plate, wherein the end plate is provided at both ends of the cell pack, the end plate being unidirectionally locked to the spacing board by an interlocking mechanism.

In an embodiment of the invention, the spacing board is perpendicular or parallel to the end plate.

In an embodiment of the invention, the end plate is provided with a limiting slot, wherein the limiting slot is provided with an avoidance hole on one side, and the deformation zone is fixed to the limiting slot through the avoidance hole to form the interlocking mechanism.

In an embodiment of the invention, the limiting slot is provided with a limiting block and a limiting recess inside the limiting slot, wherein the limiting block and the limiting recess are provided on both sides of the limiting slot in correspondence with each other, the limiting block and the limiting recess being provided at intervals along a second direction, the second direction being a vertical direction of the end plate.

In an embodiment of the invention, the deformation zone comprises a slot and an elastic piece, wherein the slot is provided at evenly spaced intervals along the second direction at the end of the spacing board, the slot being provided with a first slot wall on the inner side of an end near the end plate, one end of the elastic piece being fixedly provided on the first slot wall, and the other end of the elastic piece being provided protruding out of the body of the spacing board.

In an embodiment of the invention, the deformation zone moves into the limiting slot by compressing the elastic piece through the avoidance hole, the deformation zone being fixedly set with the end plate by the elastic piece springing back to self-lock in the limiting slot.

In an embodiment of the invention, the cell comprises a housing and a coiled inner core, wherein the coiled inner core is provided in the housing, the coiled inner core being provided in a winding structure, and the housing comprising a rounded corner structure.

In an embodiment of the invention, the housings of the adjacent cells are in contact via the rounded corner structure, the insertion post being provided in a gap formed by contacting between the rounded corner structure of the adjacent housings.

In an embodiment of the invention, the spacing board abuts an outer wall of the housing, the spacing board having a height along its vertical direction not less than a height of the housing.

In an embodiment of the invention, the cell pack is peripherally provided with a strap, wherein the strap is surrounding the cell pack and the end plate, the strap being used to shape the cell pack along the first direction.

In an embodiment of the invention, the cell comprises a square cell.

In an embodiment of the invention, it further comprises a fixing base plate, the cell pack being removably fixed to a surface of the fixing base plate, an outer edge of the fixing base plate being bent in a direction close to the cell pack to form a holding cavity, the cell pack being located within the holding cavity, the fixing base plate having a fixing hole cut into its surface, the fastener further passing through the fixing hole to fix the battery module.

In an embodiment of the invention, it further comprises a connecting component, wherein the connecting component is provided on a side of the cell pack away from the fixing base plate, the connecting component being used to achieve series-parallel connection between a plurality of the cells.

The invention also proposes a cell pack to solve the above technical problems, comprising a battery module as described above, wherein it comprises a cell pack body, the plurality of cells being provided in the cell pack body.

In an embodiment of the invention, a limiting post is provided on an inner side wall of the cell pack body, wherein the limiting post is provided contacting with the cell and the inner side wall of the cell pack body.

The invention also proposes an electric vehicle to solve the above technical problems, wherein it comprises the cell pack as described above.

By enlarging the rounded corners of the cell housing, the invention allows the intersection of multiple cells to retain a space that can be used for fixing without affecting the stacking density of cells within the battery pack; the multiple fixing groups of the invention are interconnected by connecting pieces, which can improve the overall strength; other features can be added to the fixing groups and the connecting pieces of the invention, which can be used as a mounting platform for fixing other parts within the battery pack, improving the applicability.

The invention provides a spacing board for battery modules, a battery pack, and an electric vehicle, without affecting the current volume utilization rate. The setting of the insertion post increases the number of fixing points inside the battery module, increasing the mechanical connection strength of the battery module, helping to improve the grouping rate of the battery module, increasing the volume while making the fixing of the battery module not rely on the glue connection, solving the current maintenance problem inside the highly integrated cell pack, improving the safety performance of the battery module, and having the characteristics of high structural strength, integrity and stability.

Some embodiments of the invention realize Z-directional positioning between the spacing board and the case of the battery pack by setting a spacing board between the cell pack, setting a positioning post and a flap plate on the spacing board, and opening mounting holes on the flap plate and the positioning post, so that the fixing member is fixedly connected to the case of the battery pack through the mounting holes, that is positioning along the vertical direction. Through the contact between the flap plate and the upper surface of the cell pack on both sides, the movement of the cell in the Z axis is limited. By setting end plates at each end of the cell pack, the end plates and the spacing boards are locked through the interlocking mechanism, and the avoidance holes first make the elastic piece in the deformation zone compressing and deforming, and after the deformation zone passes through the avoidance holes, the elastic piece in the slot springing back and cooperating with the X-directional limiting slot to complete the X-directional self-locking between the end plates and the central spacing boards. By setting the coiled inner core with winding structure design inside a single cell and setting the rounded corners of the housing with large rounding angle on the outside of the cell, it ensures that a certain internal space can be retained for the arrangement of fixing components when multiple cells are stacked. A supporting beam is set around each cell pack, and the supporting beam is connected to the case of the battery pack to ensure the rigidity of the connection between the battery pack and the whole vehicle.

BRIEF DESCRIPTION OF THE DRAWINGS

The features and performance of the invention are further described by the following embodiments and their accompanying drawings.

DETAILED DESCRIPTION

Figure 1:
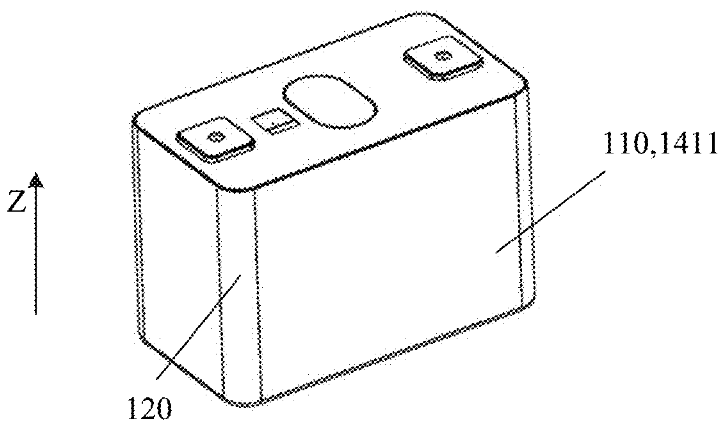
FIG. 1 is a schematic diagram of the structure of one cell in the battery module of an embodiment of the invention.

In order to make the foregoing objects, features and advantages of the invention more apparent and understandable, specific embodiments of the invention are described in detail below in connection with the accompanying drawings.

While many specific details are set forth in the following description to facilitate a full understanding of the invention, the invention may also be implemented in other ways than those described herein, and therefore the invention is not limited by the specific embodiments disclosed below.

As shown in the invention and the claims, unless the context clearly suggests an exception, the words "one", "a", and/or "the" are not specific to the singular, but may also include the plural. In general, the terms "includes" and "comprises" suggest only the inclusion of clearly identified steps and elements that do not constitute an exclusive list, and the method or apparatus may also include other steps or elements.

In detailing the embodiments of the invention, for illustration purposes, the cross-sectional views representing the structure of the device will not be locally enlarged to a general scale, and the schematic diagrams described are only examples, which should not limit the scope of protection of the invention herein. In addition, the three-dimensional spatial dimensions of length, width and depth should be included in the actual production.

For ease of description, spatial relationships such as "under", "below", "above", etc. may be used herein to describe the relationship of one element or feature shown in the accompanying drawings to other elements or features. It will be understood that these spatial relation words are intended to include directions of the device in use or operation other than those depicted in the accompanying figure. For example, if the device in the accompanying figure is flipped, the orientation of the component described as being "under" or "below" the other component or feature is changed to be "above" the other component or feature. Thus, the exemplary terms "under" and "below" can include both up and down orientations. The device may also have other orientations (rotated 90 degrees or in other directions), so the spatial relationship descriptors used here should be interpreted accordingly. It will also be understood that when a layer is referred to as being "between" two layers, it may be the only layer between said two layers, or there may be one or more layers in-between.

In the context of the invention, the described structure of the first feature "on" the second feature may include embodiments where the first and second features are formed in direct contact or may include embodiments where additional features are formed between the first and second features, such that the first and second features may not be in direct contact.

It should be understood that when a part is said to be "on", "connected to", "coupled to" or "in contact with" another part, it may be directly on, connected to or coupled to, or in contact with the other part, or an inserted part may exist. In contrast, when a part is said to be "directly on", "directly connected to", "directly coupled to", or "directly in contact" with another part, there is no inserted part. Similarly, when the first component is said to be "electrically in contact" or "electrically coupled" to the second component, there exists an electrical path between the first component and the second component that allows current to flow. The electrical path may include capacitors, coupled inductors and/or other components that allow current to flow, even without direct contact between conducting components.

The invention provides a battery module comprising a plurality of cells and a fixing component, the fixing component comprising a plurality of insertion posts, each of which is sandwiched between a plurality of cells. The battery module of the invention and the battery pack including the battery module can be used in any electrical device requiring a battery pack configuration such as an electric vehicle.

Embodiment One

FIG. 1 is a schematic diagram of the structure of a cell in a battery module of an embodiment of the invention. Referring to FIG. 1, the cell 110 is a square cell. FIG. 1 shows the actual orientation of the cell 110 when it is set in the battery module, that is, the cell 110 is set along its vertical direction, which will also be referred to as the Z-direction or Z-axis direction, as indicated by the arrow in FIG. 1. The square cell 110 has a plurality of edges extending along its vertical direction, each edge being provided with a fillet structure 120. In the embodiment shown in FIG. 1, the cell 110 has four fillet structures 120 located at each of the four edges of the square cell.

Figure 2:
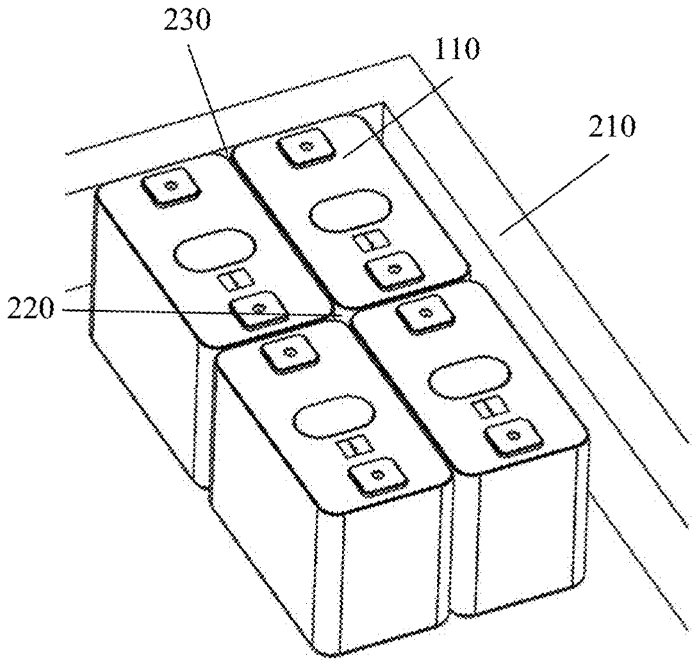
FIG. 2 is a schematic diagram of a part of the structure of the battery module of an embodiment of the invention.

FIG. 2 is a schematic diagram of a part of the structure of the battery module of an embodiment of the invention. Referring to FIG. 2, four cells 110 are included therein in close arrangement, the four cells 110 being arranged in 2 rows*2 columns. The battery pack body 210 is also shown in FIG. 2, and the four cells 110 are provided inside the battery pack body 210. The first cavity 220 is formed in the center of the four cells 110. The fixing component in the battery module is not yet included in FIG. 2.

The regular square cells do not have a fillet structure. The invention provides a fillet structure with large curvature to the edges of the housing of the cell, thereby forming the first cavity 220 in which the insertion post is provided.

It should be noted that FIG. 2 is not used to limit the number and specific arrangement of the cells 110 in the battery module.

Figure 3:
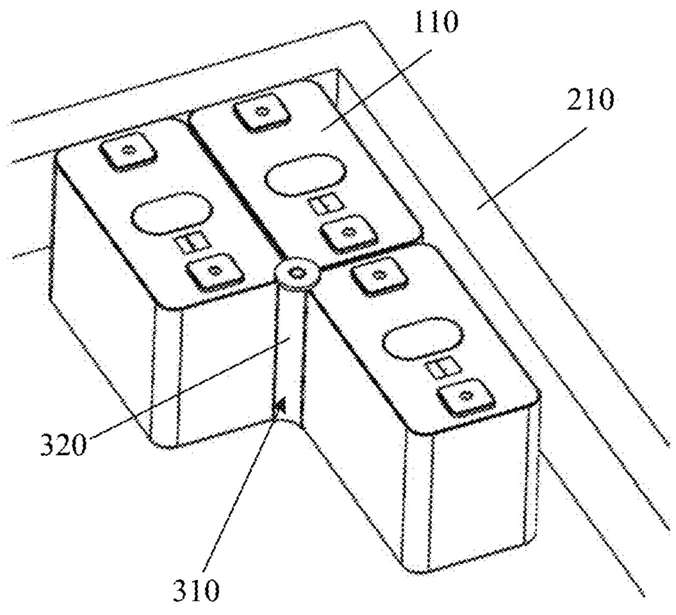
FIG. 3 is a schematic diagram of a part of the structure of the battery module of an embodiment of the invention.

FIG. 3 is a schematic diagram of a part of the structure of the battery module of an embodiment of the invention. In contrast to FIG. 2, FIG. 3 provides a fixing component 310 in the first cavity 220 formed by those four cells 110 and removes one cell 110 to expose that fixing component 310. The fixing component 310 includes a plurality of insertion posts 320, and FIG. 3 shows an insertion post 320 disposed between the four adjacent cells 110, and the insertion post 320 is contacts with the fillet structure of each adjacent cell 110, i.e. the insertion post and the fillet structure is connected with each other.

Figure 4:
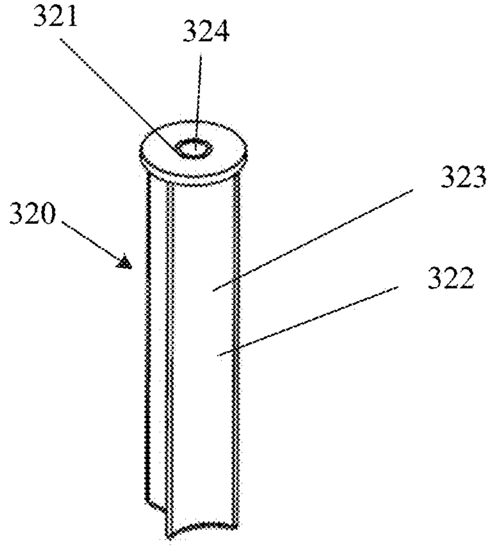
FIG. 4 is a schematic diagram of the structure of the insertion post in the battery module of an embodiment of the invention.

FIG. 4 is a schematic diagram of the structure of the insertion post in the battery module of an embodiment of the invention. Referring to FIG. 4, an insertion post 320 includes an inner cavity 321 and an outer abutment layer 322, with the inner cavity 321 provided within the outer abutment layer 322. As shown in conjunction with FIG. 3, the outer abutment layer 322 is connected with the cell 110.

Referring to both FIG. 3 and FIG. 4, the outer abutment layer 322 of the insertion post 320 of this embodiment includes four concave surfaces 323, each of which has a curvature and size matching the fillet structure of the cell 110, such that the four fillet structures of the four cells 110 adjacent to the insertion post 320 are each abutting the four concave surfaces 323 of one insertion post 320, thereby forming a stable abutment relationship.

In some embodiments, the outer abutment layer 322 is a plastic layer and the material of the inner cavity 321 is metal.

In some embodiments, the outer abutment layer 322 is an insulating layer.

In some embodiments, the inner cavity 321 is provided with a fixing member 324, and the insertion post 320 is connected to the battery pack body 210 by the fixing member 324, which is a bolt.

Figure 5:
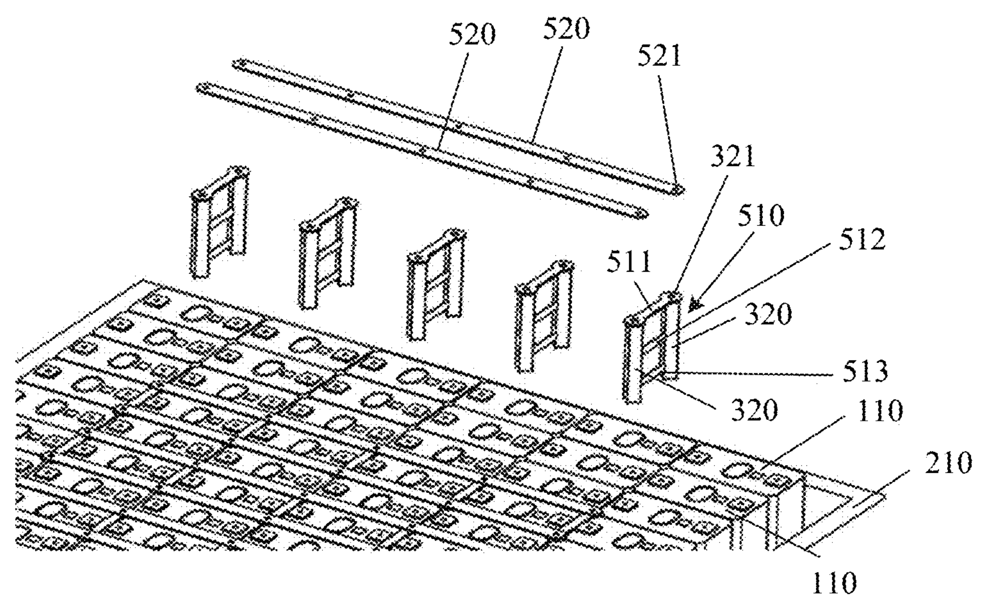
FIG. 5 is a schematic diagram of a part of the structure of the battery module of an embodiment of the invention.

FIG. 5 is a schematic diagram of a part of the structure in the battery module of an embodiment of the invention. Referring to FIG. 5, in some embodiments, a plurality of insertion posts 320 are connected and set to form a plurality of fixing groups 510, the plurality of insertion posts 320 are set in one piece, the plurality of fixing groups 510 are connected, the fixing groups 510 are provided with a plurality of connecting pieces 520, and the plurality of fixing groups 510 are connected by the connecting pieces 520.

Referring to FIG. 5, in this embodiment, two insertion posts 320 are interconnected to form a fixing group 510, which may be provided in two adjacent first cavities 220. A plurality of connection structures 511, 512, 513 are provided between the two insertion posts 320, where the connection structure 511 is used to connect the tops of the two insertion posts 320, and the connection structures 512 and 513 are used to connect the two insertion posts 320 at different heights from the outer abutment layer 322 respectively. By providing the fixing group 510, the stability of the insertion post 320 can be further strengthened, offering better support and fixing for the battery module.

Referring to FIG. 5, the connecting piece 520 is a long strip-shaped piece structure, and for the fixing group 510 having two insertion posts 320, two connecting pieces 520 are used to connect at the top of the insertion post 320. As shown in FIG. 5, the connecting piece 520 has some connecting holes 521 which correspond to the inner cavity 321 at the top of the insertion post 320. When installed, the connection piece 520 and the top of the corresponding all fixing group 510 are connected with each other, and each connection hole 521 is aligned with the inner cavity 321 at the top of the corresponding insertion post 320, and the fixing member 324 is used to pass through the connection hole 521 and the inner cavity 321, which can make the connection piece 520 and the fixing group 510 as a whole fixed together on the battery pack body 210.

Figure 6:
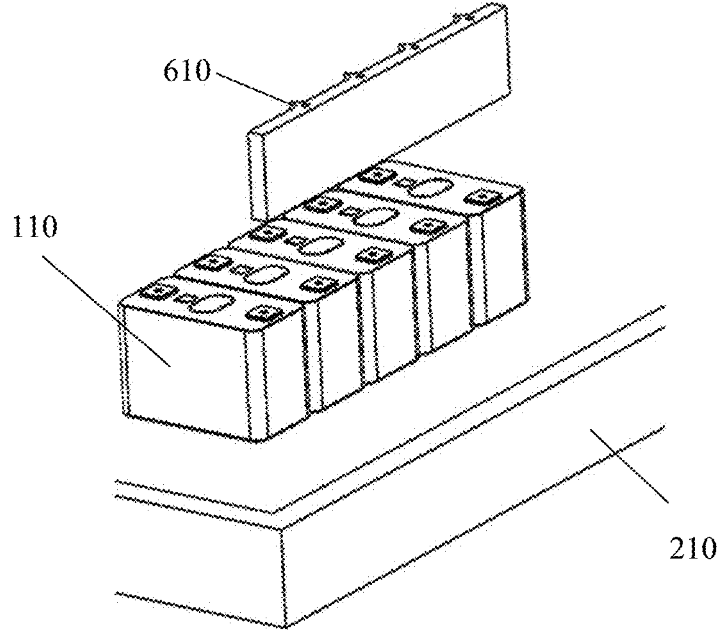
FIG. 6 is a schematic diagram of a part of the structure of the battery module of an embodiment of the invention.

FIG. 6 is a schematic diagram of a part of the structure in the battery module of an embodiment of the invention. Referring to FIG. 6, a limiting post 610 is provided on the inner side wall of the battery pack body 210, and the limiting post 610 is abutted against the cell 110 and the inner side wall of the battery pack body 210. In combination with FIG. 2, the second cavity 230 is formed between the cell 110 and the inner wall of the battery pack body 210, and the limiting post 610 shown in FIG. 6 is adapted to be inserted with the second cavity 230. It is also possible to add avoidance space in the battery pack body or leave enough space between the battery pack body and the cell for adding fixing points.

According to the embodiment shown in FIG. 1-FIG. 6, when fixing the square cells, the square cells are placed in the body of the battery pack, and the insertion post is located between the multiple square cells and is attached to the square cells. The exterior of the insertion post is coated with structural adhesive, and the insertion post is fixed to the inner wall of the bottom of the battery pack by the fixing member and is connected to the surrounding square cells by the structural adhesive, and the insertion post is connected by the connecting piece. By this way, the battery pack is fixed, and the volume utilization of the battery pack is increased.

In the invention, the gap between the cells is provided by large, rounded corners, and the parts are placed between the cell gaps for fixing in the height direction of the cells, and multiple fixing components can be connected and combined with each other, thus improving the volume utilization rate of the battery pack.

Figure 7:
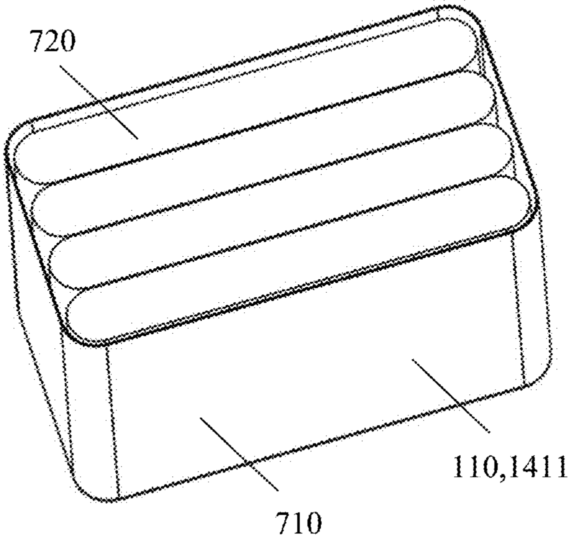
FIG. 7 is a schematic diagram of the structure of the cell in the battery module of an embodiment of the invention.

FIG. 7 is a schematic diagram of the structure of the cell in the battery module of an embodiment of the invention. Referring to FIG. 7, the structure of the internal winding of the cell 110 is highlighted therein. The cell 110 includes a housing 710 with a coiled inner core 720 inside the housing 710.

In the embodiment shown in FIG. 1-FIG. 7, the cell 110 may also be referred to as a square cell and the fillet structure is also referred to as a rounded corner.

Embodiment Two

Figure 8:
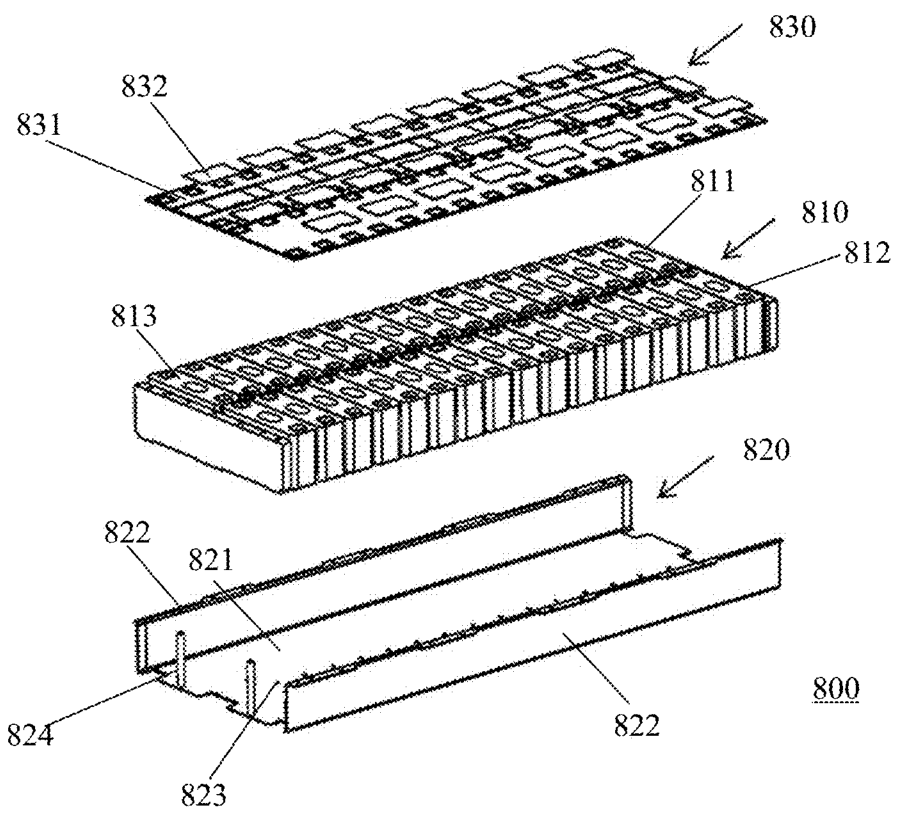
FIG. 8 is a schematic diagram of the exploded view of the battery module structure of an embodiment of the invention.

FIG. 8 is a schematic diagram of the exploded view of the battery module structure of an embodiment of the invention. Referring to FIG. 8, the battery module 800 includes a cell pack 810, a fixing base plate 820, and a connecting component 830. In this embodiment, the cell pack 810 includes two cell packs 811 and 812, each including a plurality of closely spaced cells 813. The cells 813 in FIG. 8 may be the same as or different from the cells 110 in FIG. 1-FIG. 7.

Figure 9:
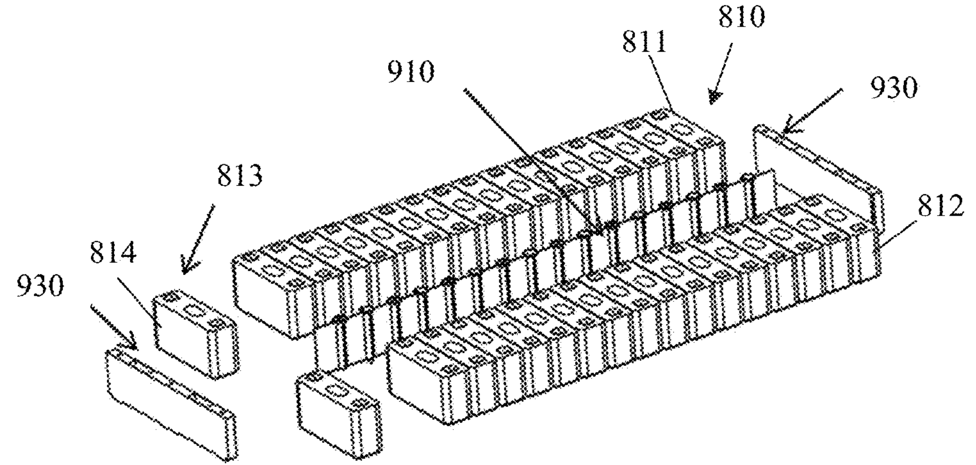
FIG. 9 is a schematic diagram of the decomposed view of the battery module structure of an embodiment of the invention.

FIG. 9 is a schematic diagram of the decomposed view of the battery module structure of an embodiment of the invention. Referring to FIG. 9, the cell pack 810 includes a spacing board 910.

Figure 10:
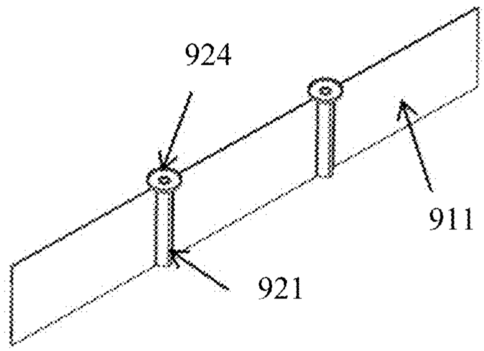
FIG. 10 is a schematic diagram of the structure of the spacing board in the battery module of an embodiment of the invention.
Figure 11:
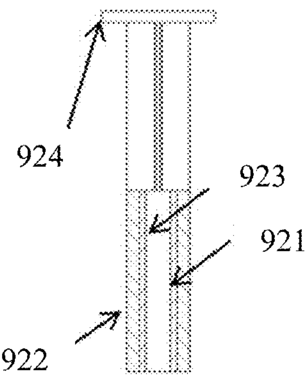
FIG. 11 is a schematic diagram of the structure of the insertion post in the battery module of an embodiment of the invention.

FIG. 10 is a schematic diagram of the structure of the spacing board in the battery module of an embodiment of the invention. FIG. 11 is a schematic diagram of the structure of the insertion post in the battery module of an embodiment of the invention. Referring to FIG. 10, the spacing board 910 includes at least two barrier sheets 911, and an insertion post is provided between two adjacent barrier sheets 911. Referring to FIG. 11, the insertion post comprises body 921 and outer abutment layer 922 which is provided on the outer wall of the body 921. Further, the body 921 is provided with an inner cavity 923, and fasteners are inserted into the inner cavity 923, and the fasteners are used to fix the insertion post and the spacing board 910.

In some embodiments, the diameter of the body 921 is not less than the thickness of the barrier sheet 911. The thickness of the barrier sheet 911 may be referred to as the thickness of the spacing board 910.

In some embodiments, the body 921 comprises a hollow rectangular, cylindrical, or prismatic column structure.

In some embodiments, the body 921 is made of a metallic material.

In some embodiments, the metallic material comprises any one or a combination of at least two of copper, zinc, aluminum, or iron and alloys thereof.

In some embodiments, the barrier sheet 911 is made of a metallic material and/or a plastic material.

In some embodiments, the outer abutment layer 922 comprises any one or a combination of at least two of aerogel felt, insulating foam board, or PP material.

It should be noted that the barrier sheet of the spacing board provided by the invention can be made of metal material and/or plastic material. When the barrier sheet and the body are made of the same metal material, a person skilled in the art can press and mold the metal material together to obtain a one-piece spacing board according to the actual situation, and then an insulating layer needs to be provided on both the body and the outer wall of the barrier sheet.

Further, the top of the body 921 is provided with a supporting platform 924 for holding the head of the fastener. The diameter of the supporting platform 924 is not smaller than the diameter of the body 921. The width of the supporting platform 924 is greater than the diameter of the body 921. As shown in FIG. 10, the supporting platform 924 is circular in shape and has a circular hole therein that exposes the inner cavity 923.

Preferably, the thickness of the supporting platform is greater than 0.5 mm.

The inner cavity 923 is provided inside the body 921 in the invention, allowing the connecting member or fixing member to reach into the inner cavity 923 for connection or fixing of the spacing board 910, and the hollow structure is used to reduce the overall weight of the spacing board 910. The supporting platform 924 provided at one end of the body 921 is able to accommodate the head of the fastener and enhance the strength of the spacing board.

In a specific implementation, the invention provides a battery module 800, wherein a cell pack 810 includes at least two cell packs 811 and 812 set side by side, and a spacing board 910 provided in a specific implementation is provided between two adjacent cell packs 811 and 812. Each cell pack includes a plurality of closely spaced individual cells 813.

The battery modules provided in the invention are compact, small in size and light in weight, and the battery modules therein have a high group formation rate and a high degree of integration, which improves the installation efficiency.

Further, as shown in FIG. 9, end plates 930 are provided on each side of the cell pack 810. In this embodiment, a total of two end plates 930 are included, which are provided at each end of the cell pack 810.

In some embodiments, the spacing board 910 is provided perpendicular or parallel to the end plates 930. In the embodiment shown in FIG. 9, the spacing board 910 is perpendicular to the end plates 930.

Referring to FIG. 9, in some embodiments, the cell 813 of the cell pack 810 includes a housing 814 with a coiled inner core (not shown) inside the housing 814.

In some embodiments, the height of the barrier sheet 11 of the spacing board 910 is not less than the height of the housing 814.

Further, the battery module 800 also includes a fixing base plate 820 to which the cell pack 810 is removably fixed to a surface of the fixing base plate 820. As shown in FIG. 8, the fixing base plate 820 includes a base plate 821, wherein the surface of the fixing base plate 820 refers to the base plate 821.

In some embodiments, the outer edge of the fixing base plate 820 is bent in a direction close to the cell pack 810 to form a holding cavity, with the cell pack 810 disposed within the holding cavity. Fixing hole 823 is provided on the surface of the fixing base plate 820, which is used to fix the cell pack 810. As shown in FIG. 8, the outer edge of the fixing base plate 820 is bent in the direction close to the cell pack 810 to form two standing plates 822, and the two standing plates 822 and the base plate 821 together form the holding cavity.

It should be noted that the invention does not make any specific limitation or special requirement for the specific structure of the fixing base plate. Exemplarily, the fixing base plate may include a base plate for supporting the cell module, and the base plate is provided with standing plates on each side, and the end plate of the cell module is set adjacent to the standing plate, and the limiting post 824 for fixing the end plate may be provided on the base plate, as shown in FIG. 8. In the invention, fasteners are inserted into the hollow chamber and fixing holes in turn to realize the fixing of the base plate and the cell module, which increases the number of fixing points inside the battery module without affecting the current volume utilization rate, enhances the mechanical strength of the battery module, and makes the cell module retain its replacement function in the battery module while having a high group formation rate.

Referring to FIG. 8, further, the battery module 800 also includes a connecting component 830, the connecting component 830 being placed on the side of the cell pack 810 away from the fixing base plate 820, the connecting component 830 being used to achieve series and parallel connection of the cells 813. As shown in FIG. 8, the fixing base plate 820 is located on the lower side of the cell pack 810 and the connecting component 830 is located on the upper side of the cell pack 810. In the compact structure after installation, the lower side of the cell pack 810 abuts against the base plate 821 and the upper side of the cell pack 810 abuts against the lower surface of the connecting component 830.

It should be noted that the invention does not make specific limitation or special requirements on the structural features and connection methods of the connecting component. Exemplarily, the connecting component 830 includes a connecting plate 831 and a sampling unit 832, as shown in FIG. 8. The connecting plate 831 is bolted, welded or buckled to the cell module, and the sampling unit 832 is electrically connected to the cell, and a person skilled in the art may select the connecting component according to the actual situation or the structure of the desired battery module, thus other forms of connecting component disclosed in the prior art or not disclosed in the new art can also be used in the invention.

The connecting plate 831 shown in FIG. 8 serves a similar function and has a different structure from the connecting pieces 520 shown in FIG. 5.

In another specific embodiment, the invention provides a battery pack including a battery module provided in one specific embodiment, the battery pack further including a case body provided on the outer wall of the battery module. Further, the fasteners of the battery module 800 pass through the fixing holes of the fixing base plate 820 and are connected to the case body to achieve removable fixing of the battery module 800 to the case body.

In the embodiment shown in FIG. 8-FIG. 13, the case body of the battery pack is equivalent to the battery pack body 210 in the embodiment shown in FIG. 1-FIG. 7, with the same function but different structures.

It should be noted that the invention does not make specific limitation or special requirements for the structure of the case, the skilled person in the field can choose according to the specific working conditions, and exemplarily, the rectangular structure can be used. The fixation of the battery module in the battery pack of the invention does not depend on bonding, so there are no specific limits for the size of the contact surface between the case and the battery module. The features on the case can be improved accordingly according to the actual situation of the technician in the field, which facilitates the use of sheet metal stamping to shape the case and reduces the manufacturing cost of the case.

In another specific embodiment, the invention provides an electric vehicle that uses a battery pack provided in one specific embodiment.

It should be noted that the fasteners provided in the invention are used for the assembly of battery modules, and it should be understood by those skilled in the art that the assembly of existing battery modules is usually done by means of bonding, resulting in a lower strength of the battery modules. By contrast, without relying on the glue, the assembly of the battery modules can be achieved by inserting fasteners inside the hollow chamber of the spacing board in the invention, which is conducive to improving the structural strength of the battery modules and the formation rate of the battery module.

Embodiments 1-3 are included in Embodiment two. The technical solutions of the invention are further described below in conjunction with the accompanying drawings and by means of specific implementation.

Embodiment 1

Figure 12:
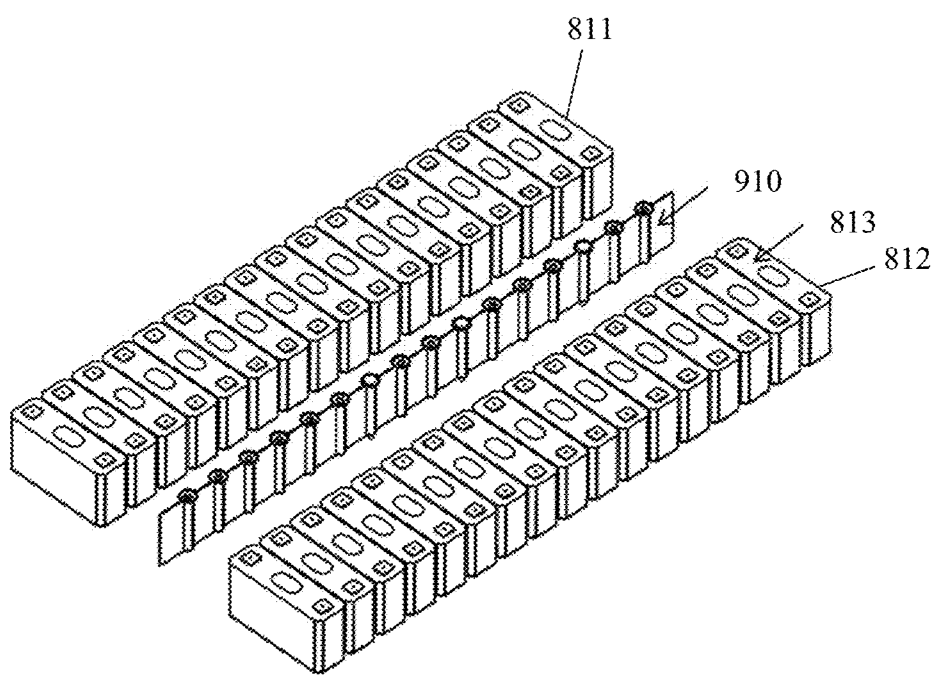
FIG. 12 is a schematic diagram of a part of the structure of the battery module of an embodiment of the invention.

FIG. 12 is a schematic diagram of a part of the structure of the battery module of an embodiment of the invention.

In this embodiment, a battery pack is provided, including a battery module and a case set on the outer wall of the battery module, wherein the battery module includes a fixing base plate 820, a cell pack 810 and a connecting component 830, and the cell pack 810 is located inside the fixing base plate 820, and the connecting component 830 is provided on the side of the cell pack 810 away from the fixing base plate 820.

As shown in FIG. 9, FIG. 10 and FIG. 12, both sides of the cell pack 810 are provided with end plates 930, and the cell pack 810 includes two groups of cell packs 811 and 812 set side by side, and each group of cell packs 811 and 812 is arranged with seventeen cells 813, and a spacing board 910 is provided between the two cell packs 811 and 812, and the spacing board 910 is perpendicular to the end plate 930. The spacing board 910 includes seventeen barrier sheets 911, and the adjacent two barrier sheets 911 are provided with an insertion post, which includes the body 921 and the outer abutment layer 922 set on the outer wall of the body 921, wherein the insertion post is made of aluminum alloy, the barrier sheet 11 is made of plastic, and the outer abutment layer 922 is insulating foam.

A through inner cavity 923 is arranged in the body 921, and a supporting platform 924 is arranged at one end of the body 921. The body 921 is a hollow cylindrical structure and the diameter of the body 921 is larger than the thickness of the barrier sheet 11. The supporting platform 924 is a disc structure with through holes on the surface, and the radius of the supporting platform 924 is larger than the radius of the cross section of the body 921. The cell 813 includes an aluminum housing and a coiled inner core set inside the aluminum housing. The side of the aluminum housing near the body 921 is curved, the barrier sheet 11 of the spacing board 910 is closely attached to the outer wall of the housing, and the supporting platform 924 is located above the aluminum housing.

The fixing base plate 820 includes the base plate 821, both sides of the base plate 821 are vertically set with the standing plate 822 and the body 921 of the spacing board 910 is set close to the base plate 821 at the end of the body 921 away from the supporting platform 924. The surface of the base plate 821 is provided with a row of fixing holes 823. The spacing board 910 also includes sixteen fasteners, and the fasteners are inserted into the inner cavity 923 of the spacing board 910 and pass through the fixing holes 823 to realize the connection of the cell pack 810 and the fixing base plate 820. The base plate 823 supports the cell pack 810, and the standing plate 822 is attached to both sides of the cell pack 810 respectively.

Embodiment 2

Figure 13:
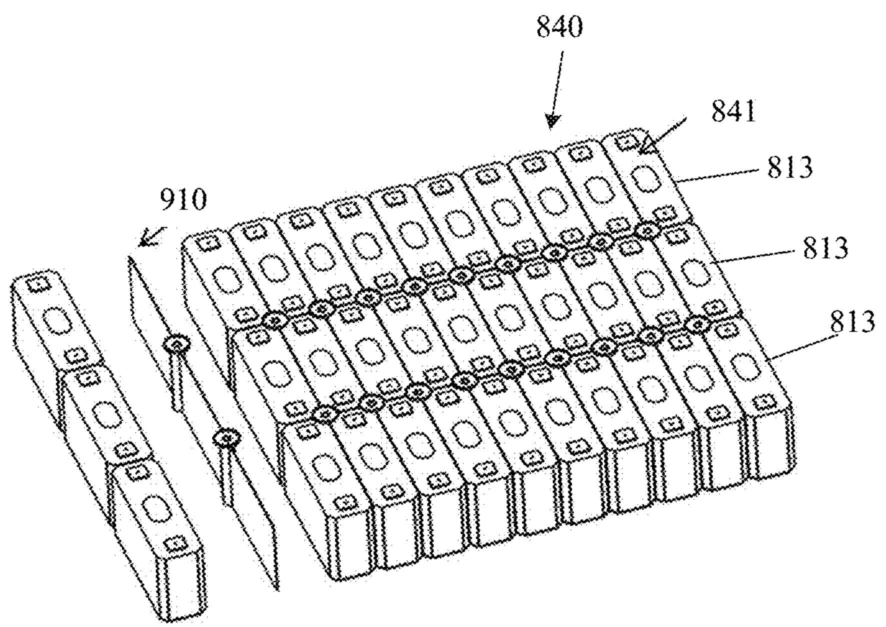
FIG. 13 is a schematic diagram of a part of the structure of the battery module of an embodiment of the invention.

FIG. 13 is a schematic diagram of a part of the structure of the battery module of an embodiment of the invention.

In this embodiment, a battery pack is provided, including a battery module and a case set on the outer wall of the battery module, wherein the battery module includes a fixing base plate 820, a cell pack 840 and a connecting component 830, and the cell pack 840 is located within the fixing base plate 820, and the connecting component 830 is provided on the side of the cell pack 840 away from the fixing base plate 820.

As shown in FIG. 9, FIG. 10 and FIG. 13, the battery module includes a cell pack 840, with an end plate 930 on each side of the cell pack 840, and the cell pack 840 includes eleven cell packs 841 set side by side, each cell pack 841 including three cells 813 connected in sequence, with a spacing board 910 set between two adjacent cell packs 841, i.e. a total of ten spacing boards 910. Each spacing board 910 is parallel to the end plate 930, each spacing board 910 includes three barrier sheets 911, and between two adjacent barrier sheets 911 there is an insertion post. The insertion post includes the body 921 and the outer abutment layer 922 set on the outer wall of the body 921, wherein the insertion post is made of iron alloy, the barrier sheets 911 are made of plastic, and the outer abutment layer 922 is aerogel felt.

A through inner cavity 923 is arranged in the body 921, and a supporting platform 924 is arranged at one end of the body 921. The body 921 is a hollow cylindrical structure, the diameter of the body 921 is larger than the thickness of the barrier sheet 911, and the supporting platform 924 is a disc structure with holes on the surface, and the radius of the supporting platform 924 is larger than the radius of the body 921. The cell 813 includes a housing and a coiled inner core set inside the steel housing, and the steel housing has a curved surface on the side of the body 921 near the spacing board 910, and the barrier sheet 911 of the spacing board 910 is closely attached to the outer wall of the steel housing, and the supporting platform 924 is located above the steel housing.

Fixing base plate 820 includes a base plate 821, both sides of the base plate 821 are vertically set with standing plate 822, the end of the body 921 of spacing board 910 which is away from the supporting platform 924 is set near the base plate 821. Ten rows of fixing holes 823 are provided on the surface of the base plate 821, and the spacing board 910 also includes twenty fasteners, and the fasteners are inserted into the inner cavity 923 of the spacing board 910 and pass through the fixing holes to realize the connection between the cell pack 840 and the fixing base plate 820. The base plate 821 supports the cell pack 840, and the standing plates 822 is closely attached to the two sides of the cell pack 840 respectively.

Embodiment 3

The difference between embodiment 3 and embodiment 2 is that the insertion post is made of stainless steel and the barrier sheet 911 is made of plastic and the outer abutment layer 922 is made of PP material. The other parts of embodiment 3 are the same as embodiment 2, and the content of the description about embodiment 2 can be referred to.

The battery module provided in the invention has a high group formation rate and high integration, without affecting the current volume utilization rate. The setting of the spacing board 910 increases the number of fixing points inside the battery module, increases the mechanical connection strength of the battery module, improves the volume of the battery module, at the same time, makes the fixing of the battery module without depending on the glue connection, solves the current maintenance problem inside the highly integrated battery pack, improves the safety performance of the battery module, and has the characteristics of high structural strength, strong integrity and stability.

The battery pack provided by the invention increases the number of fixing points inside the battery module without affecting the current volume utilization rate, increases the mechanical connection strength between the battery module and the case through the multi-point connection with the case, increases the volume of the battery module without depending on the glue connection with the case, and solves the current maintenance problem inside the highly integrated battery pack.

In the embodiment shown in FIG. 8-FIG. 13, the spacing board 910 is also referred to as the isolating plate, the inner cavity 923 is also referred to as the hollow chamber, the outer abutment layer 922 is also referred to as the insulation layer, the insertion post is also referred to as the pressure-bearing member, and each cell pack 811 and 812 is also referred to as the cell module.

Embodiment Three

Figure 14:
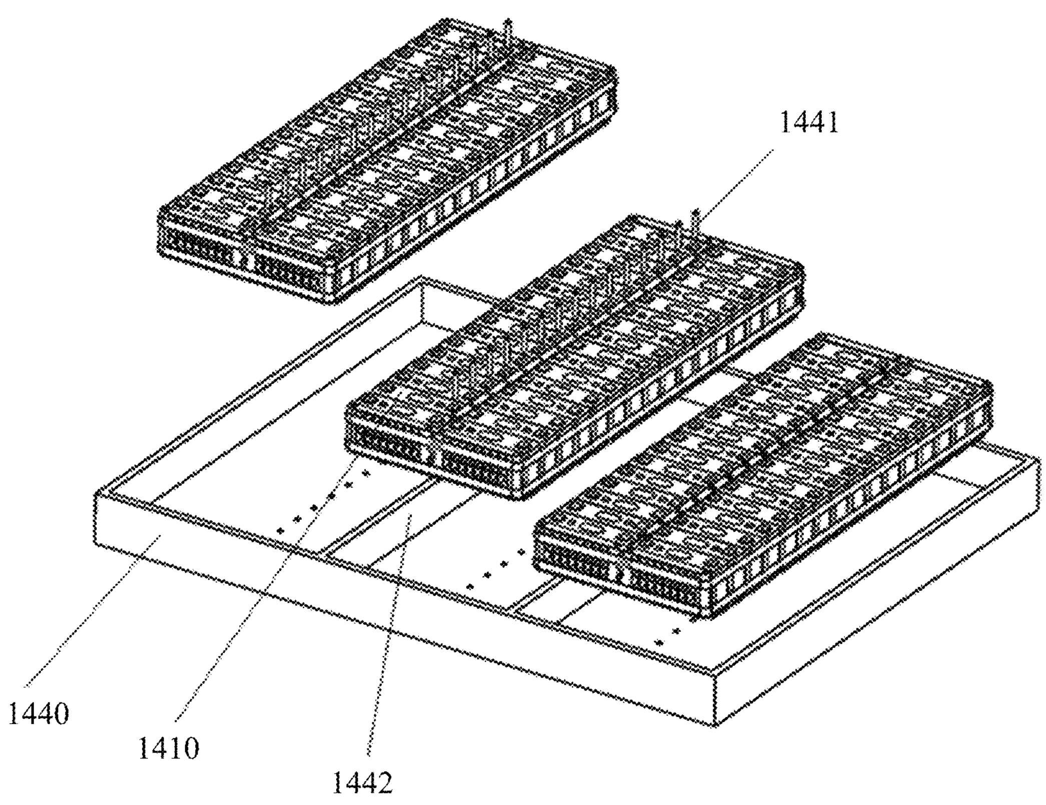
FIG. 14 is a schematic diagram of the structure of a battery module and its battery pack of an embodiment of the invention.
Figure 15:
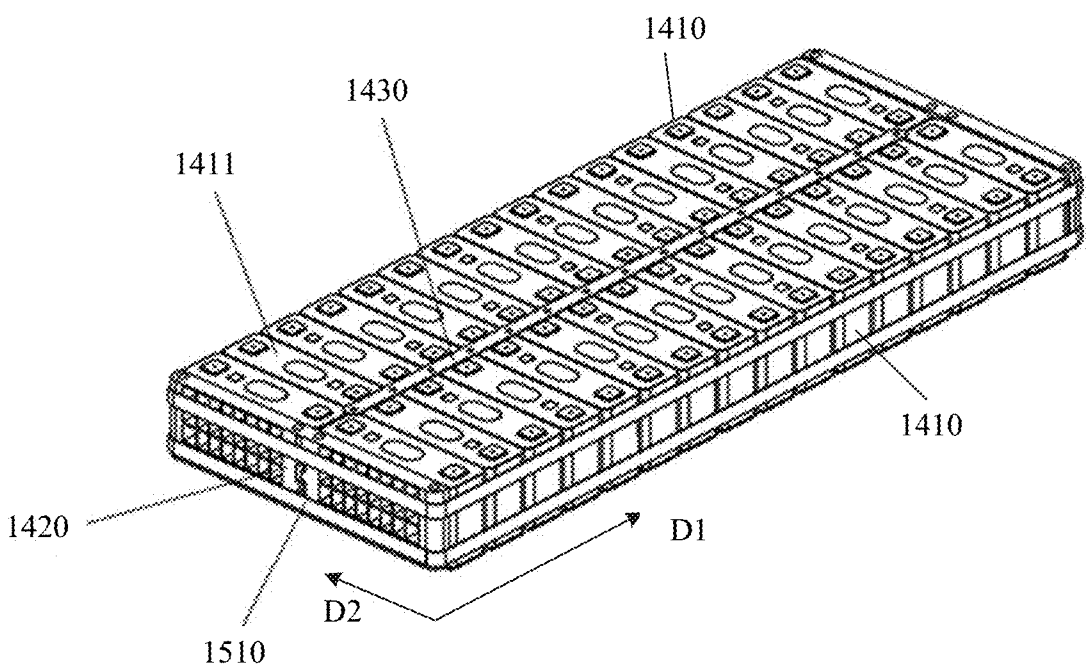
FIG. 15 is a schematic diagram of the structure of the battery module of an embodiment of the invention.
Figure 16:
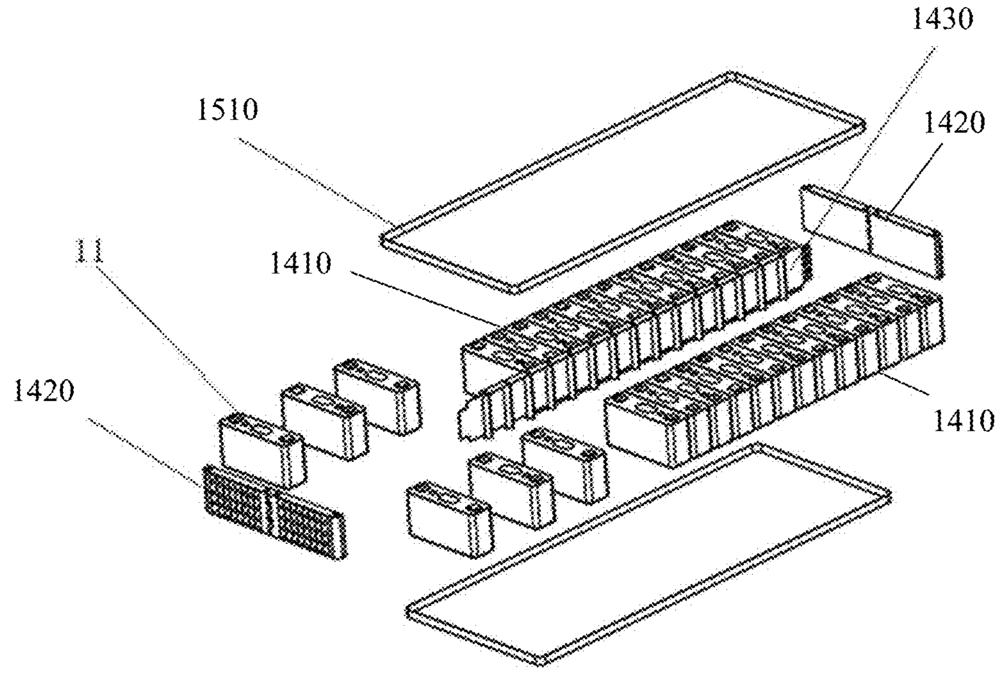
FIG. 16 is a schematic diagram of the exploded view of the battery module of the embodiment shown in FIG. 15.

A schematic diagram of the structure of a battery module and its battery pack is shown in FIG. 14, a schematic diagram of the structure of a battery module is shown in FIG. 15, and an exploded schematic diagram of a battery module is shown in FIG. 16. The battery module includes a cell pack 1410, an end plate 1420, and a spacing board 1430. The cell pack 1410 includes a plurality of cells 1411 with charge and discharge functions, and the plurality of cells 1411 are arranged and set as a cell pack 1410.

A schematic diagram of the structure of the cell 1411 is also shown in FIG. 1, and a schematic diagram of the structure of the cell 1411 is also shown in FIG. 7. Referring to FIG. 7, the cell 1411 includes a housing 710 and a coiled inner core 720. The coiled inner core 720 is set in the housing 710, the coiled inner core 720 is set with a winding structure, and the housing 710 is set with a rounded corner structure. The cell 1411 is set in contact with each other through the housing 710 of the rounded corner structure.

Figure 17:
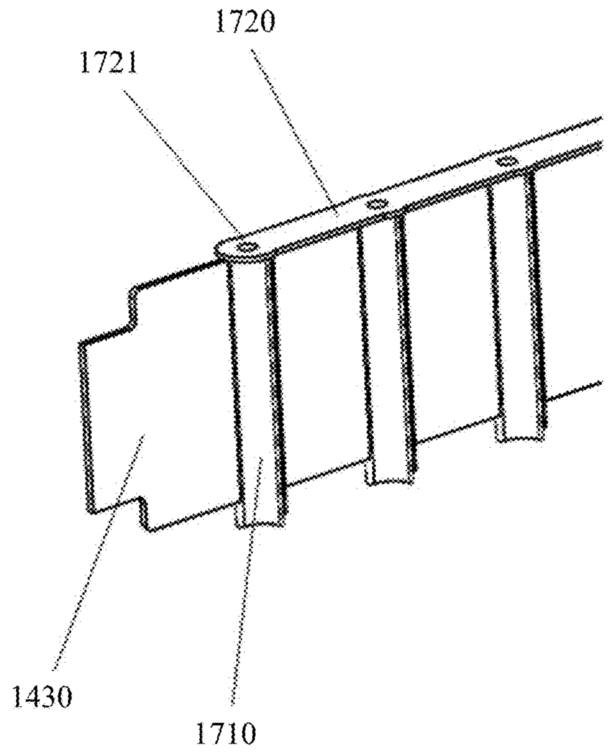
FIG. 17 is a schematic diagram of the structure of the spacing board of the battery module of the embodiment shown in FIG. 15.

FIG. 17 is a schematic diagram of the structure of the spacing board in the battery module of an embodiment of the invention. Referring to FIG. 17, the insertion post 1710 is set within the gap formed by the contact of the rounded corner structure of the adjacent housing 710, thereby enabling a certain internal space to be retained for the arrangement of the fixing components. In this embodiment, the cell 1411 is a square cell. The cell pack 1410 is provided with a strap 1510 outside for lengthwise shaping, and the strap 1510 is provided around the cell pack 1410 and the end plate 1420.

Referring to FIG. 15, wherein mutually perpendicular first direction D1 and second direction D2 are indicated. The cell 1411 has a width extending along the first direction D1, a plurality of cells 1411 are arranged along the first direction D1 to form the cell pack 1410, and the spacing board 1430 extends along the first direction D1.

What shows in FIG. 17 is a schematic diagram of the structure of the spacing board 1430, the spacing board 1430 is provided between the cell pack 1410 and the adjacent cell pack 1410, a plurality of insertion posts 1710 are uniformly spaced on the spacing board 1430. The distance between the adjacent insertion posts 1710 corresponds to the width of the cell 1411, and the cell 1411 is fixedly set between the insertion posts 1710.

Figure 18:
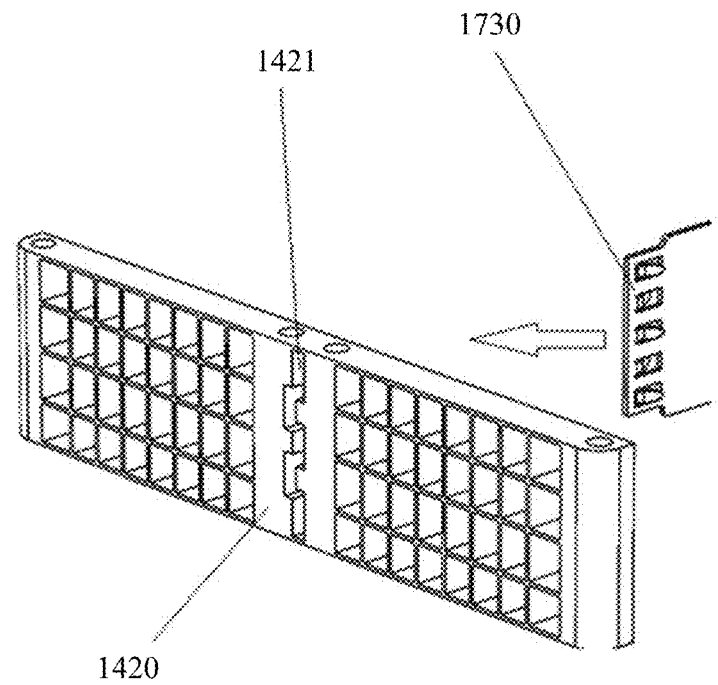
FIG. 18 is a schematic diagram of the structure of the end plate of the battery module of the embodiment shown in FIG. 15.

As shown in FIG. 17 and FIG. 18, the spacing board 1430 is provided with a flap plate 1720 and a deformation zone 1730, and the flap plate 1720 and the insertion post 1710 are set perpendicular to each other. The flap plate 1720 is set protruding from the spacing board 1430, and the flap plate 1720 is set in contact with the upper surface of the cell pack 1410, the deformation zone 1730 is set at the end of the spacing board 1430, the flap plate 1720 is provided with a mounting hole 1721, a through-hole is provided in the insertion post 1710, and the mounting hole 1721 is provided corresponding to the through-hole.

FIG. 18 shows a schematic diagram of the structure of the end plate 1420. A partial enlarged view of FIG. 18 is shown in FIG. 21.

As shown in FIG. 16, the end plate 1420 is provided at each end of the cell pack 1410, and the end plate 1420 is provided with the spacing board 1430 by interlocking mechanism for unidirectional locking. As shown in FIG. 18, the end plate 1420 is provided with a limiting slot 1421, and the limiting slot 1421 is provided with a avoidance hole 1422 on one side corresponding to the spacing board 1430, and the deformation zone 1730 on the spacing board 1430 is fixed to the limiting slot 1421 through the avoidance hole 1422 to form the interlocking mechanism.

Figure 21:
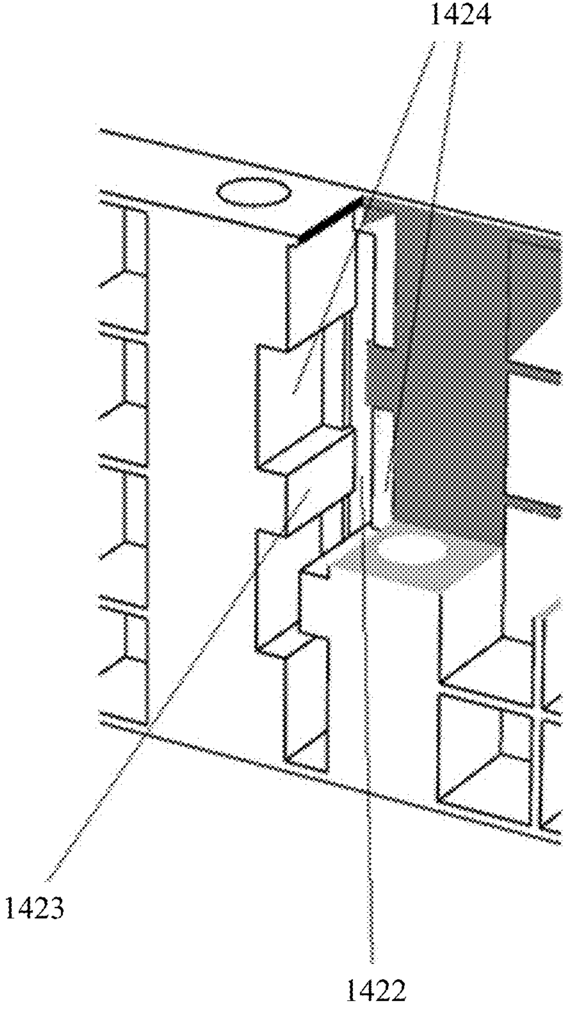
FIG. 21 is a partially enlarged view of the end plate of the embodiment shown in FIG. 18.

As shown in FIG. 21, the limiting slot 1421 is provided with a limiting block 1423 and a limiting recess 1424, and the limiting block 1423 and the limiting recess 1424 are provided on both sides of the limiting slot 1421 correspondingly to each other, and the limiting block 1423 and the limiting recess 1424 are provided in the limiting slot 1421 at longitudinal intervals.

Figure 19:
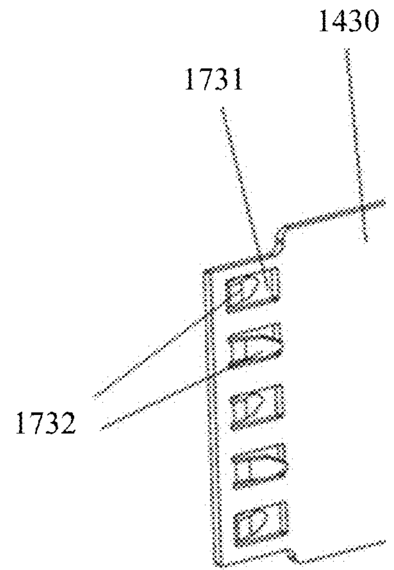
FIG. 19 is a schematic diagram of the structure of the deformation zone of the spacing board of the battery module of the embodiment shown in FIG. 17.
Figure 20:
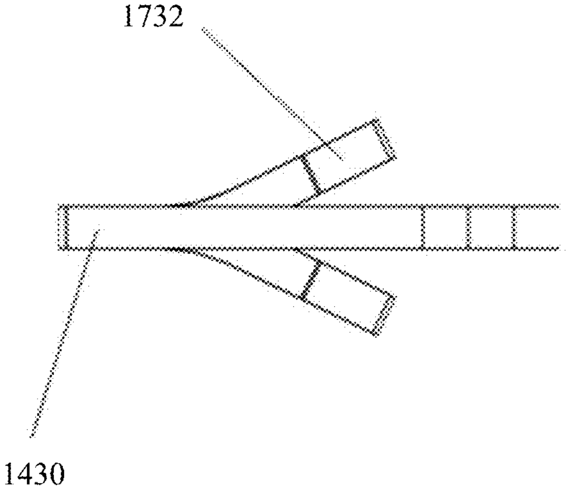
FIG. 20 is a schematic top view of the deformation zone of the embodiment shown in FIG. 19.

A schematic diagram of the structure of the deformation zone 1730 is shown in FIG. 19, and a top view schematic diagram of the deformation zone 1730 is shown in FIG. 20.

Referring to FIG. 19, the deformation zone 1730 includes a slot 1731 and an elastic piece 1732. The slot 1731 is longitudinally and uniformly spaced open at the end of the end plate 1420, the slot 1731 is provided with the first slot wall on the inside of one end near the end plate 1420. One end of the elastic piece 1732 is fixedly set on the first slot wall, and the other end of the elastic piece 1732 is protruding from the plate body of the spacing board 1430. The deformation zone 1730 is fixedly set with the end plate 1420 by compressing the elastic piece 1732 to move into the limiting slot 1421 through the avoidance hole 1422, and the deformation zone 1730 is fixedly set with the end plate 1420 by springing back the elastic piece 1732 to self-lock in the limiting recess 1424.

Referring to FIG. 14, the invention also provides a battery pack employing a battery module comprising a case 1440, a supporting beam 1442 provided within the case 1440, the supporting beam 1442 provided between adjacent battery modules, the battery module being fixedly provided within the case 1440 by a fixing member 1441, the fixing member 1441 being provided through a mounting hole 1721 through the insertion post 1710. In this embodiment, a bolt is used as the fixing member 1441.

Comparing the embodiment shown in FIG. 14 with the embodiment shown in FIG. 2, the case 1440 is equivalent to the battery pack body 210.

In the embodiment shown in FIG. 14-FIG. 21, the insertion post 1710 is also referred to as the positioning post, the limiting block 1423 is also referred to as the Y-directional limiting block, and the limiting recess 1424 is also referred to as the X-directional limiting recess.

The process of setting up the battery module and battery pack of embodiment three includes: setting each of the cells 1411 in a cell pack 1410, correspondingly, between the insertion posts 1710 on one side of the spacing board 1430, and bonding the cells 1411 to the spacing board 1430, which may be done by glue bonding or tape bonding, or other means of bonding. After completing the setting of the cell pack 1410 on one side of the spacing board 1430, the cell pack 1410 on the other side of the spacing board 1430 is fixed in the same way. Set the end plate 1420 at both ends of the cell pack 1410, as shown in the direction of the arrow in FIG. 18, fix the end plate 1420 and the spacing board 1430 to each other. The avoidance hole 1422 makes the elastic piece 1732 in the deformation zone 1730 be compressed and deformed first, and after the deformation zone 1730 passes through the avoidance hole 1422, the elastic piece 1732 in the slot 1731 springs back and fits with the limiting recess 1424. The X-directional self-locking between the end plate 1420 and the central spacing board 1430 is completed. After the entire battery module is formed, shaping is performed in the length direction by the strap 1510. After the shaping is completed, the bolts are fixed inside the case 1440 through the mounting holes 1721 and insertion posts 1710. There are supporting beams 1442 around each battery module, and the supporting beams 1442 are connected to the outer frame of the case 1440 to ensure the rigidity of the connection between the battery pack and the whole vehicle.

The basic concepts have been described above, and it is clear that the above disclosure of the invention is intended as an example only and does not constitute a limitation of the invention to those skilled in the art. Although not expressly stated herein, there are various modifications, improvements, and amendments that may be made to the invention by those skilled in the art. Such modifications, improvements and amendments are suggested in the invention, so such modifications, improvements and amendments remain within the spirit and scope of the exemplary embodiments of the invention.

What is claimed is:

1. A battery module comprising a plurality of cells and a fixing component, wherein the fixing component comprises a plurality of insertion posts, each of the plurality of insertion posts being sandwiched between the plurality of the cells, each of the plurality of insertion posts comprises a body, wherein the body comprises an inner cavity, the inner cavity passing through the body; the battery module further comprising a plurality of fasteners, wherein each of the plurality of fasteners is inserted in the inner cavity of a respective one of the plurality of insertion posts to fix the respective one of the plurality of insertion posts.

2. The battery module according to claim 1, wherein each of the plurality of cells is provided with a fillet structure on the edges, and each of the plurality of insertion posts and the fillet structure is connected with each other.

3. The battery module according to claim 2, wherein the body further comprises an outer abutment layer, wherein the inner cavity is provided within the outer abutment layer, and the outer abutment layer and each of the plurality of cells is connected with each other.

4. The battery module according to claim 3, wherein the outer abutment layer is an insulating layer.

5. The battery module according to claim 1, wherein each of the plurality of insertion posts further comprises a supporting platform on a top of the body for holding a head of a respective one of the plurality of fasteners, and the width of the supporting platform is larger than the diameter of the body.

6. The battery module according to claim 2, wherein two or more of the plurality of the insertion posts are connected to form a fixing group.

7. The battery module according to claim 2, wherein a plurality of fixing groups is formed, with each one of the plurality of fixing groups being formed by connecting two or more of the plurality of insertion posts.

8. The battery module according to claim 7, wherein each of the plurality of fixing groups is provided with a plurality of connecting pieces, and the plurality of fixing groups are connected by the connecting pieces.

9. The battery module according to claim 1, wherein the battery module further comprises a plurality of cell packs and a spacing board, wherein each of the plurality of cell packs comprise multiple ones of the plurality of cells, each cell having a width extending in a first direction, the plurality of cells arranged in the first direction to form the cell pack, the spacing board provided between adjacent ones of the plurality of cell packs, the spacing board extending in the first direction, the plurality of the insertion posts evenly spaced on the spacing board, a distance between the adjacent ones of the plurality of insertion posts corresponding to the width of the cell, the cell being fixedly provided between the adjacent ones of the plurality of insertion posts.

10. The battery module according to claim 9, wherein the spacing board is provided with a flap plate and a deformation zone, wherein the flap plate and each of the plurality of insertion posts are set perpendicular to each other, and the flap plate is provided by protruding from the spacing board, and the flap plate is provided with a mounting hole, wherein the mounting hole is set corresponding to the inner cavity and the deformation zone is provided at the end of the spacing board.

11. The battery module according to claim 10, wherein the battery module further comprises two end plates, wherein one of the two end plates is respectfully provided at each end of the cell pack, each of the two end plates being unidirectionally locked to the spacing board by an interlocking mechanism.

12. The battery module according to claim 11, wherein the spacing board is perpendicular or parallel to the end plate.

13. The battery module according to claim 11, wherein the end plate is provided with a limiting slot, wherein the limiting slot is provided with an avoidance hole on one side, and the deformation zone is fixed to the limiting slot through the avoidance hole to form the interlocking mechanism.

14. The battery module according to claim 13, wherein the limiting slot is provided with a limiting block and a limiting recess inside the limiting slot, wherein the limiting block and the limiting recess are provided on both sides of the limiting slot in correspondence with each other, the limiting block and the limiting recess being provided at intervals along a second direction, the second direction being a vertical direction of the end plate.

15. The battery module according to claim 14, wherein the deformation zone comprises a slot and an elastic piece, wherein the slot is provided at evenly spaced intervals along the second direction at the end of the spacing board, the slot being provided with a first slot wall on the inner side of an end near the end plate, one end of the elastic piece being fixedly provided on the first slot wall, and the other end of the elastic piece being provided protruding out of the body of the spacing board.

16. The battery module according to claim 15, wherein the deformation zone moves into the limiting slot by compressing the elastic piece through the avoidance hole, the deformation zone being fixedly set with the end plate by the elastic piece springing back to self-lock in the limiting slot.

17. The battery module according to claim 9, wherein each of the plurality of cells comprise a housing and a coiled inner core, wherein the coiled inner core is provided in the housing, the coiled inner core being provided in a winding structure, and the housing comprising a rounded corner structure.

18. The battery module according to claim 17, wherein the housing of adjacent ones of the plurality of cells are in contact with each other via the rounded corner structure, the insertion post being provided in a gap formed by contacting between the rounded corner structure of the adjacent housings.

19. The battery module according to claim 17, wherein the spacing board abuts an outer wall of the housing, the spacing board having a height along its vertical direction not less than a height of the housing.

20. The battery module according to claim 11, wherein the cell pack is peripherally provided with a strap, wherein the strap is surrounding the cell pack and the end plate, the strap being used to shape the cell pack along the first direction.

21. The battery module according to claim 1, wherein the cell comprises a square cell.

22. The battery module according to claim 9, wherein the battery module further comprises a fixing base plate, the cell pack being removably fixed to a surface of the fixing base plate, an outer edge of the fixing base plate being bent in a direction closer to the cell pack to form a holding cavity, the cell pack being located within the holding cavity, the fixing base plate having a fixing hole cut into its surface fixing base plate, one of the plurality of fasteners further passing through the fixing hole to fix the battery module.

23. The battery module according to claim 22, wherein the battery module further comprises a connecting component, wherein the connecting component is provided on a side of the cell pack away from the fixing base plate, the connecting component being used to achieve series connection and/or parallel connection between a plurality of the cells.

24. A battery pack comprising the battery module according to claim 1, the battery pack further comprising a battery pack body, the plurality of cells being provided in the battery pack body.

25. The battery pack according to claim 24, wherein a limiting post is provided on an inner side wall of the battery pack body, wherein the limiting post is provided contacting with the plurality of cells and the inner side wall of the battery pack body.

26. An electric vehicle, the electric vehicle comprising the battery pack according to claim 24.

* * * * *